(12) United States Patent
Fallone et al.

(10) Patent No.: US 8,082,433 B1
(45) Date of Patent: Dec. 20, 2011

(54) DISK DRIVE EMPLOYING BOOT DISK SPACE TO EXPEDITE THE BOOT OPERATION FOR A HOST COMPUTER

(75) Inventors: Robert M. Fallone, Lake Forest, CA (US); William B. Boyle, Lake Forest, CA (US)

(73) Assignee: Western Digital Technologies, Inc., Irvine, CA (US)

(*) Notice: Subject to any disclaimer, the term of this patent is extended or adjusted under 35 U.S.C. 154(b) by 867 days.

(21) Appl. No.: 12/030,042

(22) Filed: Feb. 12, 2008

(51) Int. Cl.
*G06F 15/177* (2006.01)
(52) U.S. Cl. ............ 713/2; 711/163; 711/173; 365/215
(58) Field of Classification Search .................. 713/1, 2; 711/163, 173; 365/215
See application file for complete search history.

(56) References Cited

U.S. PATENT DOCUMENTS

| | | | |
|---|---|---|---|
| 5,155,833 A | 10/1992 | Cullison et al. | |
| 5,269,019 A | 12/1993 | Peterson et al. | |
| 5,269,022 A | 12/1993 | Shinjo et al. | |
| 5,307,497 A | 4/1994 | Feigenbaum et al. | |
| 5,448,719 A | 9/1995 | Schultz et al. | |
| 5,581,785 A | 12/1996 | Nakamura et al. | |
| 5,636,355 A | 6/1997 | Ramakrishnan et al. | |
| 5,713,024 A * | 1/1998 | Halladay ....................... | 717/168 |
| 5,724,501 A | 3/1998 | Dewey et al. | |
| 5,812,883 A | 9/1998 | Rao | |
| 5,832,005 A | 11/1998 | Singh | |
| 5,966,732 A | 10/1999 | Assaf | |
| 5,978,922 A | 11/1999 | Arai et al. | |
| 6,073,232 A * | 6/2000 | Kroeker et al. .................. | 713/1 |
| 6,098,158 A | 8/2000 | Lay et al. | |
| 6,101,574 A | 8/2000 | Kumasawa et al. | |
| 6,209,088 B1 | 3/2001 | Reneris | |
| 6,286,108 B1 | 9/2001 | Kamo et al. | |
| 6,434,696 B1 | 8/2002 | Kang | |
| 6,449,683 B1 | 9/2002 | Silvester | |
| 6,539,456 B2 | 3/2003 | Stewart | |
| 6,662,267 B2 | 12/2003 | Stewart | |
| 6,745,283 B1 | 6/2004 | Dang | |
| 6,807,630 B2 | 10/2004 | Lay et al. | |
| 6,904,496 B2 | 6/2005 | Raves et al. | |
| 6,968,450 B1 | 11/2005 | Rothberg et al. | |
| 6,993,649 B2 | 1/2006 | Hensley | |
| 7,099,993 B2 | 8/2006 | Keeler | |

(Continued)

FOREIGN PATENT DOCUMENTS

JP 406110786 A 4/1994

OTHER PUBLICATIONS

Office Action dated Jun. 27, 2005, U.S. Appl. No. 10/185,880, (17 pages).

(Continued)

*Primary Examiner* — Thuan Du

(57) ABSTRACT

A disk drive is disclosed wherein boot data is transmitted from a first plurality of data sectors to a host during a first boot operation, and a log is maintained identifying a plurality of the transmitted data sectors. The log is used to write the boot data to a boot disk space comprising a second plurality of data sectors. During a second boot operation, the boot data is pre-fetched from the second plurality of data sectors of the boot disk space and stored in a cache.

22 Claims, 8 Drawing Sheets

U.S. PATENT DOCUMENTS

| | | |
|---|---|---|
| 7,107,444 B2 | 9/2006 | Fortin et al. |
| 7,130,962 B2 | 10/2006 | Garney |
| 7,181,608 B2 | 2/2007 | Fallon et al. |
| 7,461,202 B2 | 12/2008 | Forrer, Jr. et al. |
| 7,464,250 B2 * | 12/2008 | Dayan et al. ............... 711/217 |
| 7,669,044 B2 * | 2/2010 | Fitzgerald et al. ............ 713/1 |
| 2001/0039612 A1 | 11/2001 | Lee |
| 2002/0156970 A1 | 10/2002 | Stewart |
| 2003/0135729 A1 | 7/2003 | Mason, Jr. et al. |
| 2003/0142561 A1 | 7/2003 | Mason, Jr. et al. |
| 2003/0212857 A1 | 11/2003 | Pacheco et al. |
| 2004/0003223 A1 | 1/2004 | Fortin et al. |
| 2004/0064647 A1 | 4/2004 | DeWhitt et al. |
| 2006/0294352 A1 | 12/2006 | Morrison et al. |
| 2007/0005883 A1 | 1/2007 | Trika |
| 2007/0083743 A1 | 4/2007 | Tsang |
| 2007/0083746 A1 | 4/2007 | Fallon et al. |
| 2008/0209198 A1 * | 8/2008 | Majni et al. ............... 713/2 |

OTHER PUBLICATIONS

Notice of Allowance dated Oct. 22, 2010 from U.S. Appl. No. 12/030,074, 11 pages.

* cited by examiner

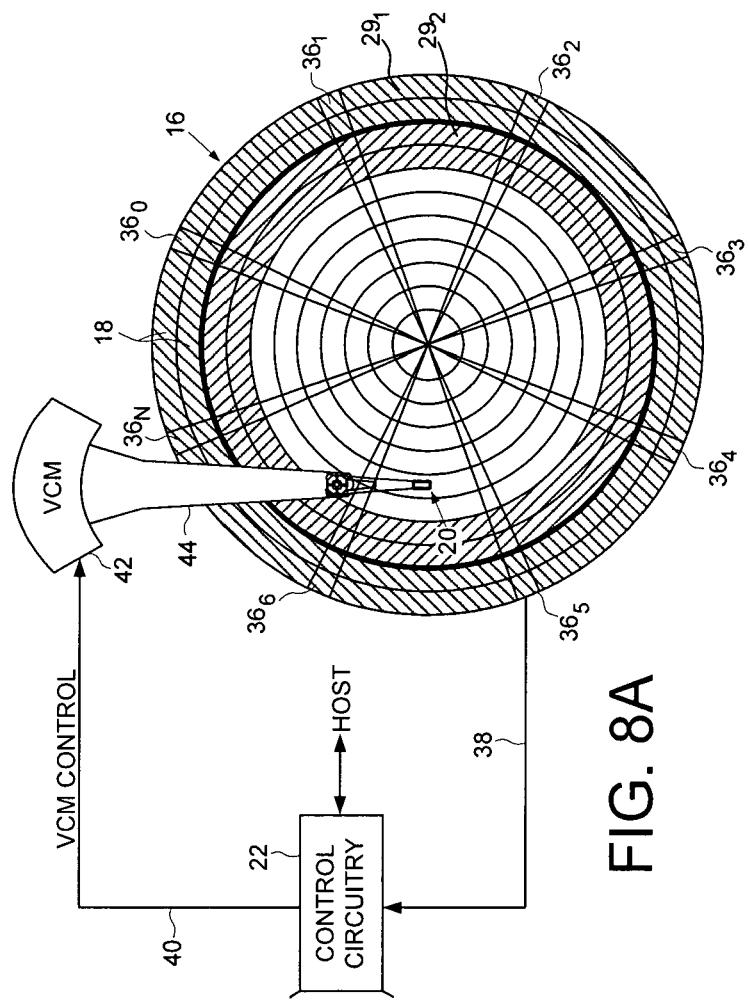
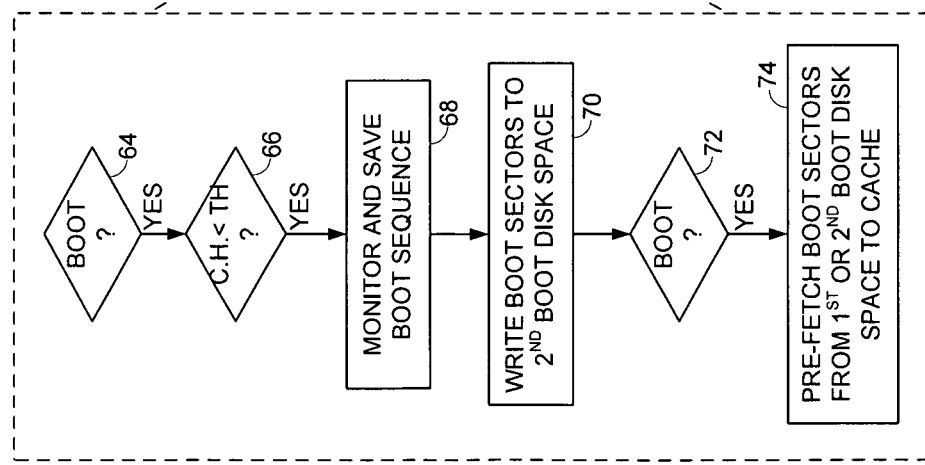
FIG. 8A
FIG. 8B

DISK DRIVE EMPLOYING BOOT DISK SPACE TO EXPEDITE THE BOOT OPERATION FOR A HOST COMPUTER

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the velocity of the actuator arm as it seeks from track to track.

FIG. 1 shows a prior art disk format 2 as comprising a number of data tracks 6 defined by servo sectors $4_0$-$4_N$ recorded around the circumference of each data track. Each servo sector 4, comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a track address, used to position the head over a target data track during a seek operation. Each servo sector 4, further comprises groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

When a disk drive is installed into a host computer (e.g., a personal computer), an operating system (OS) is normally loaded onto the disk, after which the host computer may boot from the disk drive. Due to the mechanical latency of the disk drive (the seek latency of the actuator arm and the rotational latency of the disk) the boot operation may be undesirably long. In addition, if the disk is accessed non-sequentially when reading the operating system, the boot operation may take even longer due to the head seeking to target tracks and waiting to reach target data sectors.

There is, therefore, a need for a disk drive which helps expedite the boot operation for a host computer.

BRIEF DESCRIPTION OF THE DRAWINGS

FIG. 8A shows a disk drive according to an embodiment of the present invention wherein the disk comprises first and second boot disk spaces for storing the data sectors of two different boot sequences.

FIG. 8B is a flow diagram according to an embodiment of the present invention wherein if the number of cache hits of the pre-fetched boot data sectors is less than a threshold, a new boot sequence of data sectors are written to a second boot disk space for pre-fetching during subsequent boot operations.

DETAILED DESCRIPTION OF EMBODIMENTS OF THE INVENTION

Figure 1:
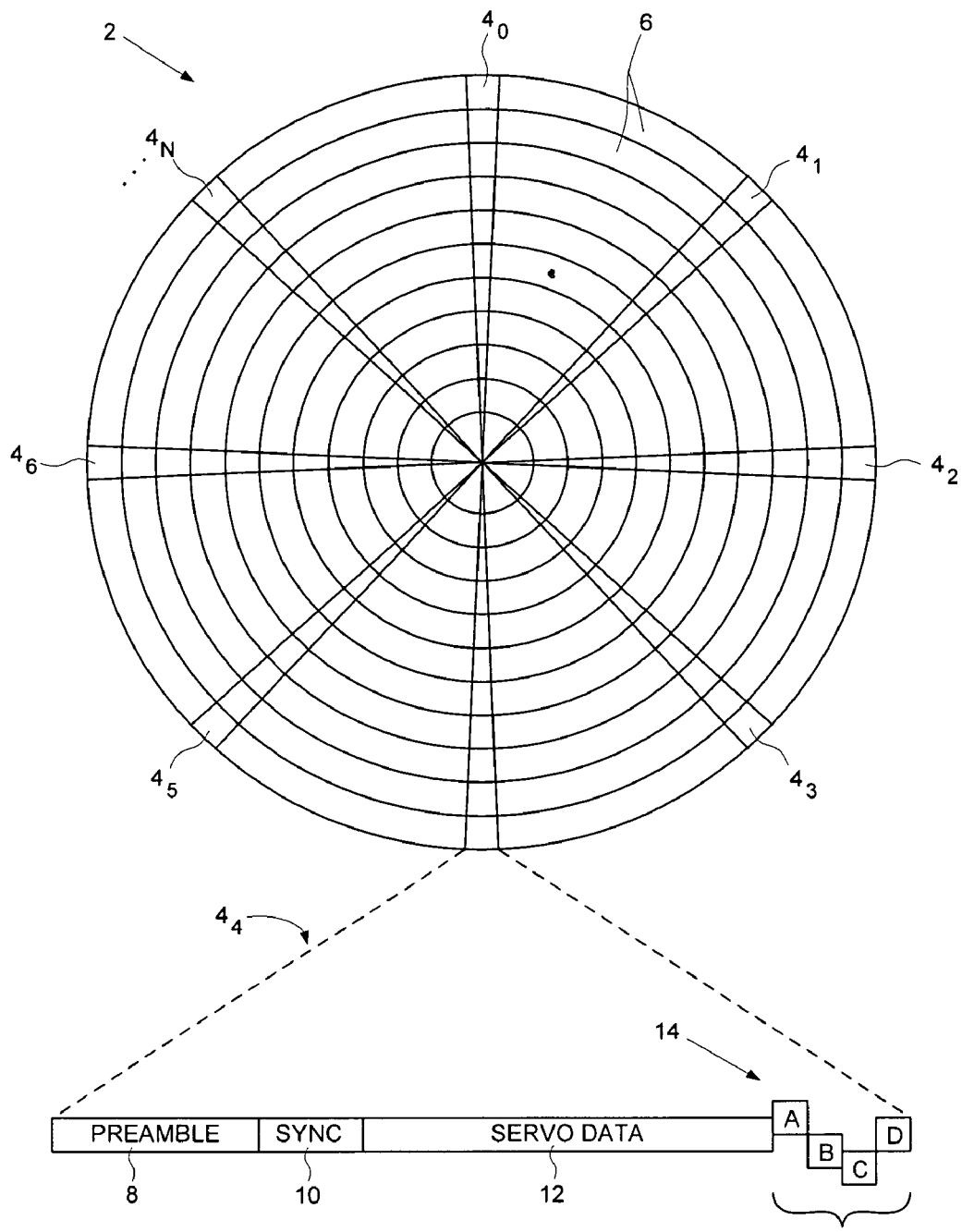
FIG. 1 shows a prior art disk format comprising a plurality of data tracks defined by a plurality of servo sectors.
Figure 2A:
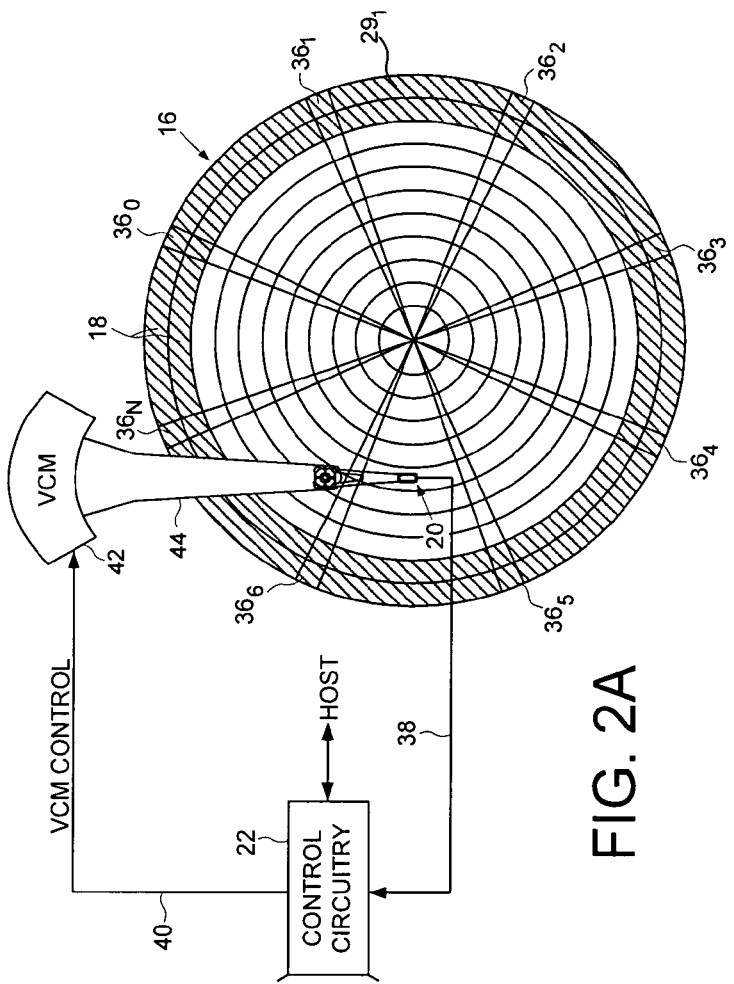
FIG. 2A shows a disk drive according to an embodiment of the present invention comprising a head actuated over the disk, and control circuitry.
Figure 2B:
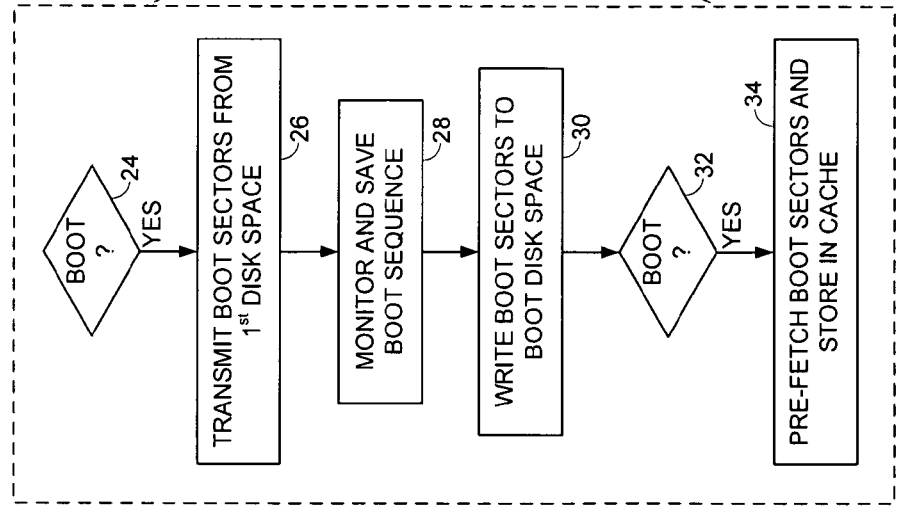
FIG. 2B is a flow diagram executed by the control circuitry according to an embodiment of the present invention wherein during a boot operation the boot sequence is saved and the corresponding data sectors stored in a boot disk space for pre-fetching during subsequent boot operations.

FIG. 2A shows a disk drive according to an embodiment of the present invention comprising a disk 16 including a plurality of data tracks 18, wherein each data track comprises a plurality of data sectors. The disk drive further comprises a head 20 actuated over the disk, and control circuitry 22 operable to execute the flow diagram of FIG. 2B. During a first boot operation (step 24), first boot data is transmitted from a first plurality of data sectors to a host (step 26), and a log is maintained identifying a plurality of the transmitted data sectors (step 28). The log is used to write the first boot data to a first boot disk space $29_1$ comprising a second plurality of data sectors (step 30). During a second boot operation (step 32), the first boot data is pre-fetched from the second plurality of data sectors of the boot disk space $29_1$ and stored in a cache (step 34).

In the embodiment of FIG. 2A, the disk 16 comprises a plurality of embedded servo sectors $36_0$-$36_N$ that define the data tracks 18. The control circuitry 22 processes a read signal 38 emanating from the head 20 to demodulate the embedded servo sectors $36_0$-$36_N$ and generate a position error signal (PES) representing a radial offset of the head 20 from a target track 18. The control circuitry 22 processes the PES with a suitable servo compensator to generate a control signal 40 applied to a voice coil motor (VCM) 42. The VCM 42 rotates an actuator arm 44 about a pivot in order to actuate the head 20 radially over the disk 16 in a direction that decreases the PES.

The first boot disk space $29_1$ may comprise any suitable area of the disk 16, and in the embodiment of FIG. 2A, an outer band of consecutive data tracks on the disk 16. In one embodiment, the second plurality of data sectors within the boot disk space $29_1$ comprises a consecutive sequence of data sectors. In this manner, during a boot operation the data sectors can be pre-fetched from the boot disk space $29_1$ as a consecutive sequence, thereby avoiding the mechanical seek latency of the actuator arm 44 and the rotational latency of the disk 16 associated with accessing random data sectors (or random groups of data sectors).

Figure 3:
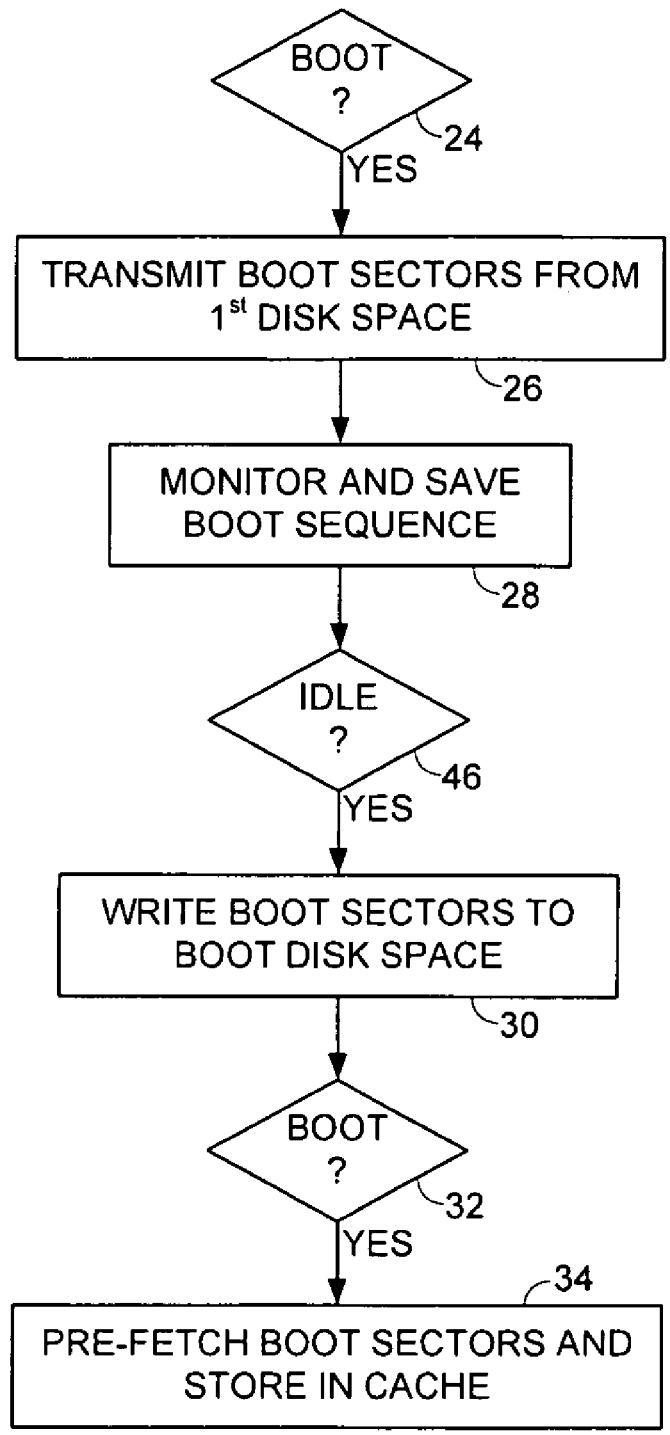
FIG. 3 shows a flow diagram according to an embodiment of the present invention wherein the boot sequence data sectors are written to the boot disk space during an idle mode of the disk drive.

FIG. 3 is a flow diagram according to an embodiment of the present invention wherein the control circuitry 22 is operable to write the boot data to the boot disk space $29_1$ (step 30) during an idle mode (step 46). The control circuitry 22 may enter the idle mode at any suitable time, for example, after a predetermined interval during which no commands are received from the host. In one embodiment, the control circuitry 22 may exit the idle mode in order to processes a host command, and then re-enter the idle mode to continue writing the boot data to the boot disk space $29_1$.

The control circuitry 22 may write the boot data to the boot disk space $29_1$ (step 30) in any suitable manner. In one embodiment, the boot data is saved in a cache memory prior to being transmitted to the host (step 26). The boot data is then written from the cache memory to the boot disk space $29_1$ (step 30), for example, during the idle mode. In another embodiment, the boot data is reread from the first plurality of data sectors and then written to the boot disk space, for example, during the idle mode.

Figure 4:
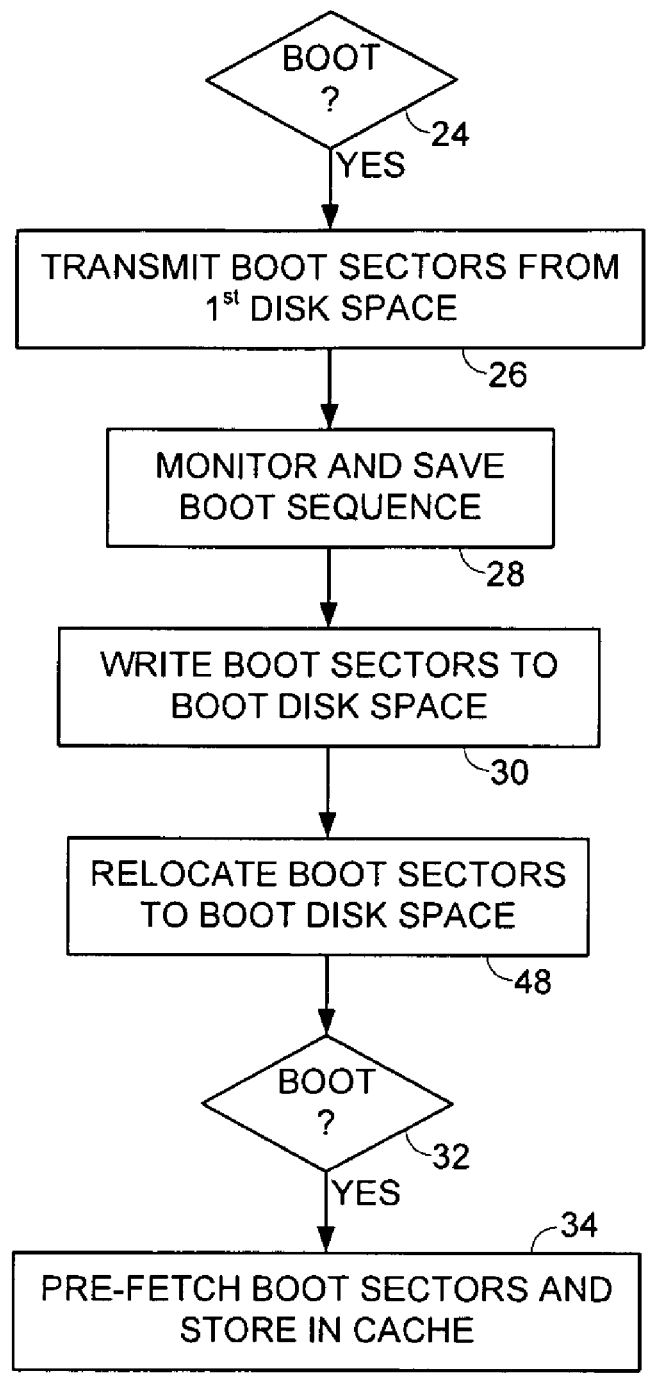
FIG. 4 is a flow diagram according to an embodiment of the present invention wherein the boot sequence data sectors are relocated to the boot disk space.
Figure 5:
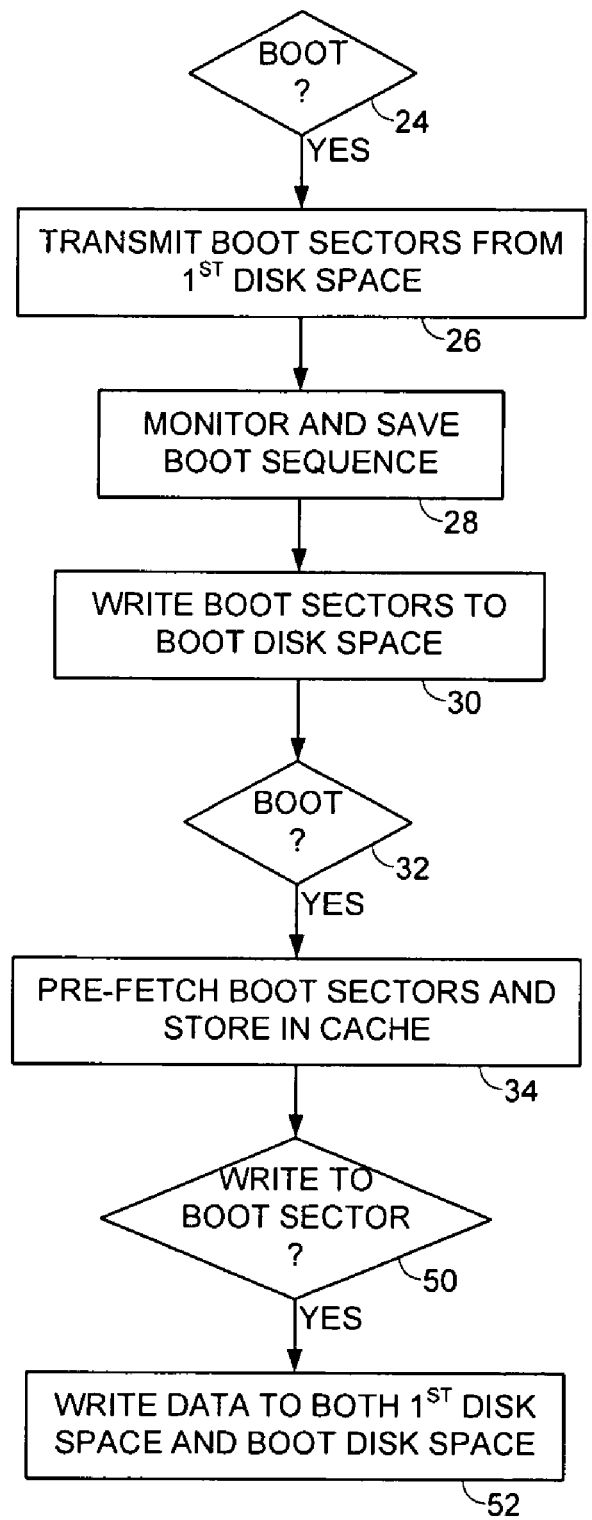
FIG. 5 is a flow diagram according to an embodiment of the present invention wherein the boot sequence data sectors are copied to the boot disk space, and then both data sectors are updated to maintain coherency.

FIG. 4 is a flow diagram according to an embodiment of the present invention wherein the control circuitry 22 relocates a logical block address assigned to one of the boot sectors of the first disk space to one of the data sectors of the boot disk space $29_1$ (step 48). In this manner, if the host performs a write to the boot sector of the first disk space (e.g., to update the operating system), the boot sector is automatically updated within the boot disk space $29_1$. In another embodiment shown in the flow diagram of FIG. 5, the control circuitry 22 copies the boot data stored in the boot sectors of the first disk space to the data sectors of the boot disk space $29_1$. If the host performs a write to one of the boot sectors (step 50), the control circuitry 22 writes the data to both the first disk space where the boot sectors were originally written as well as to the data sectors of the boot disk space $29_1$ (step 52) in order to maintain coherency between the two disk spaces.

Figure 6:
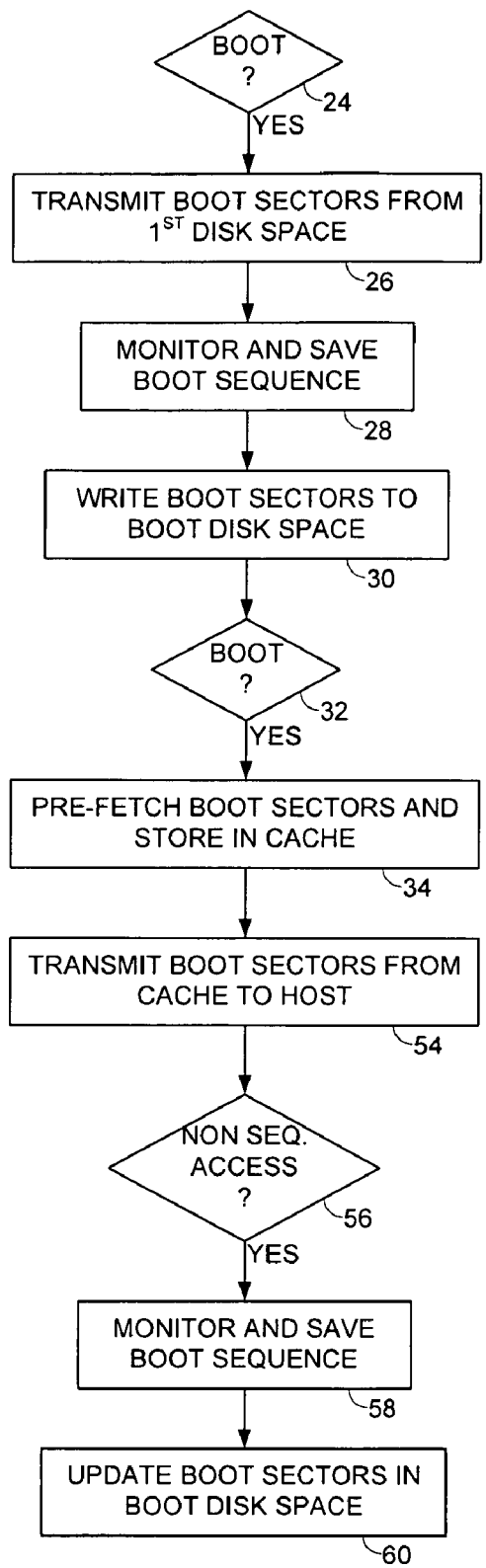
FIG. 6 is a flow diagram according to an embodiment of the present invention wherein the boot sequence data sectors are updated if there is a non-sequential access away from the boot disk space during a boot operation.

FIG. 6 shows a flow diagram according to an embodiment of the present invention wherein the boot data stored in the boot disk space $29_1$ may be updated if the boot sequence changes, for example, if the operating system is updated by the host. In one embodiment, the control circuitry 22 transmits the boot sectors stored in the cache to the host (step 54) and detects a change in the boot sequence if there is a cache miss, that is, if there is a non-sequential access (step 56) away from the boot disk space $29_1$. The control circuitry 22 monitors the change in the boot sequence (step 58) and then updates the boot sectors stored in the boot disk space $29_1$ (step 60), for example, during an idle mode of the disk drive.

Figure 7:
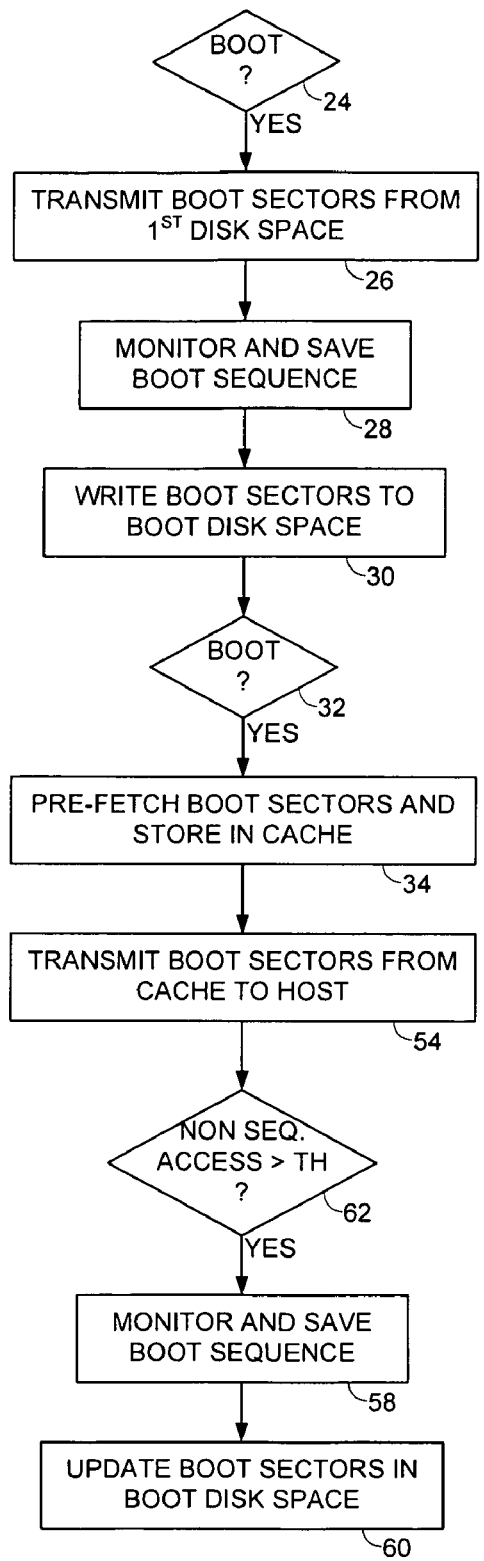
FIG. 7 is a flow diagram according to an embodiment of the present invention wherein the boot sequence data sectors are updated if a number non-sequential accesses away from the boot disk space exceeds a threshold during a boot operation.

In an embodiment shown in the flow diagram of FIG. 7, the control circuitry 22 detects a change in the boot sequence if the number of non-sequential accesses away from the boot disk space $29_1$ exceeds a threshold (step 62). This embodiment avoids needing to update the boot disk space $29_1$ with a new boot sequence unless there is a significant change to the boot sequence. That is, a small number of non-sequential accesses away from the boot disk space $29_1$ may not degrade performance enough to justify updating the boot disk space $29_1$.

The boot data stored in the boot disk space $29_1$ may comprise any suitable data loaded by the host during a boot operation. In one embodiment, the boot data comprises an operating system (OS), such as the Windows OS or the Mac OS. In another embodiment, the host may enter a hibernate mode wherein the state of the host is saved in a hibernate file on the disk drive. When the host awakens from the hibernate mode, the boot data is read from the hibernate file in order to restore the state of the host rather than reload the operating system. In one embodiment, the boot sectors associated with the hibernate file are relocated or copied to the boot disk space $29_1$ and pre-fetched from the boot disk space $29_1$ in order to expedite the boot operation when the host awakens from the hibernate mode.

In an embodiment shown in FIG. 8A, the disk drive may comprise a plurality of boot disk spaces, such as a first boot disk space $29_1$ and a second boot disk space $29_2$, wherein each boot disk space stores boot data for different boot sequences. In one embodiment, the boot sequences may correspond to different operating systems, and in another embodiment, a first boot sequence may correspond to an operating system and a second boot sequence may correspond to a hibernate file.

FIG. 8B shows a flow diagram executed by the control circuitry 22 according to an embodiment of the present invention wherein if a new boot sequence is detected during a boot operation, then the corresponding boot sectors are written to a second boot disk space $29_2$, for example, during an idle mode of the disk drive. The control circuitry 22 may detect a new boot sequence in any suitable manner, and in the embodiment of FIG. 8B, the control circuitry 22 detects a new boot sequence when during a boot operation (step 64) the cache hits for the pre-fetch boot data from the first boot disk space $29_1$ is less than a threshold (step 66). The control circuitry 22 monitors the new boot sequence (step 68) and then writes the corresponding boot sectors to the second boot disk space $29_2$ (step 70). During a subsequent boot operation (step 72) the control circuitry 22 pre-fetches boot sectors from the first or second boot disk spaces, for example, based on the boot sectors requested by the host during the boot operation. In another embodiment, the control circuitry 22 pre-fetches boot sectors from both disk cache spaces at the beginning of the boot operation prior to receiving any read commands from the host. After receiving a number of read commands, the control circuitry 22 determines which boot disk space correlates with the requested boot sectors and then pre-fetches only from that boot disk space.

Any suitable control circuitry 22 may be employed in the embodiments of the present invention, such as any suitable integrated circuit or circuits. For example, the control circuitry 22 may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry 22 comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk 16 and read into a volatile semiconductor memory when the disk drive is powered on. In yet another embodiment, the control circuitry 22 comprises suitable logic circuitry, such as state machine circuitry.

What is claimed is:
1. A disk drive comprising:
  a disk comprising a plurality of data tracks, wherein each data track comprises a plurality of data sectors;
  a head actuated over the disk; and
  control circuitry operable to:
    transmit first boot data from a first plurality of data sectors to a host during a first boot operation;

maintain a log identifying a plurality of the transmitted data sectors;
use the log to write the first boot data to a first boot disk space comprising a second plurality of data sectors; and
pre-fetch the first boot data from the second plurality of data sectors and store the first boot data in a cache during a second boot operation.

2. The disk drive as recited in claim 1, wherein the first boot disk space comprises a band of consecutive data tracks.

3. The disk drive as recited in claim 2, wherein the second plurality of data sectors comprises a consecutive sequence.

4. The disk drive as recited in claim 3, wherein if during the second boot operation a number of non-sequential accesses exceeds a threshold the control circuitry is further operable to:
transmit second boot data from a third plurality of the data sectors to the host during the second boot operation;
modify the log; and
use the log to overwrite the first boot data stored in the second plurality of data sectors with the second boot data.

5. The disk drive as recited in claim 1, wherein the control circuitry is operable to write the first boot data to the first boot disk space during an idle mode.

6. The disk drive as recited in claim 1, wherein the control circuitry is further operable to relocate a logical block address assigned to one of the first plurality of data sectors to one of the second plurality of data sectors.

7. The disk drive as recited in claim 1, wherein the control circuitry is further operable to:
receive a write command from the host to write second boot data to the disk; and
write the second boot data to the first plurality of data sectors and to the second plurality of data sectors.

8. The disk drive as recited in claim 1, wherein the control circuitry is further operable to:
transmit second boot data from a third plurality of the data sectors to the host during the second boot operation;
modify the log; and
use the log to overwrite the first boot data stored in the second plurality of data sectors with the second boot data.

9. The disk drive as recited in claim 1, wherein the control circuitry is further operable to:
transmit second boot data from a third plurality of the data sectors to the host during the second boot operation;
modify the log; and
use the log to write the second boot data to a second boot disk space comprising a third plurality of data sectors.

10. The disk drive as recited in claim 9, wherein the first boot data corresponds to a first operating system, and the second boot data corresponds to a second operating system.

11. The disk drive as recited in claim 9, wherein the first boot data corresponds to an operating system, and the second boot data corresponds to a hibernate mode of the host.

12. A method of operating a disk drive, the disk drive comprising a disk comprising a plurality of data tracks, wherein each data track comprises a plurality of data sectors, and a head actuated over the disk, the method comprising:
transmitting first boot data from a first plurality of data sectors to a host during a first boot operation;
maintaining a log identifying a plurality of the transmitted data sectors;
using the log to write the first boot data to a first boot disk space comprising a second plurality of data sectors; and
pre-fetching the first boot data from the second plurality of data sectors and storing the first boot data in a cache during a second boot operation.

13. The method as recited in claim 12, wherein the first boot disk space comprises a band of consecutive data tracks.

14. The method as recited in claim 13, wherein the second plurality of data sectors comprises a consecutive sequence.

15. The method as recited in claim 14, wherein if during the second boot operation a number of non-sequential accesses exceeds a threshold, further comprising:
transmitting second boot data from a third plurality of the data sectors to the host during the second boot operation;
modifying the log; and
using the log to overwrite the first boot data stored in the second plurality of data sectors with the second boot data.

16. The method as recited in claim 12, further comprising writing the first boot data to the first boot disk space during an idle mode.

17. The method as recited in claim 12, further comprising relocating a logical block address assigned to one of the first plurality of data sectors to one of the second plurality of data sectors.

18. The method as recited in claim 12, further comprising:
receiving a write command from the host to write second boot data to the disk; and
writing the second boot data to the first plurality of data sectors and to the second plurality of data sectors.

19. The method as recited in claim 12, further comprising:
transmitting second boot data from a third plurality of the data sectors to the host during the second boot operation;
modifying the log; and
using the log to overwrite the first boot data stored in the second plurality of data sectors with the second boot data.

20. The method as recited in claim 12, further comprising:
transmitting second boot data from a third plurality of the data sectors to the host during the second boot operation;
modifying the log; and
using the log to write the second boot data to a second boot disk space comprising a third plurality of data sectors.

21. The method as recited in claim 20, wherein the first boot data corresponds to a first operating system, and the second boot data corresponds to a second operating system.

22. The method as recited in claim 20, wherein the first boot data corresponds to an operating system, and the second boot data corresponds to a hibernate mode of the host.

* * * * *